United States Patent
Levrai et al.

(10) Patent No.: US 6,186,042 B1
(45) Date of Patent: Feb. 13, 2001

(54) PNEUMATIC BOOSTER WITH FLOATING REACTION DISC AND DYNAMICALLY CANCELLABLE REACTION

(75) Inventors: Roland Levrai, Stains; Herve Pujol, Le Pre-St-Gervais; Jean-Pierre Boisseau, Paris, all of (FR)

(73) Assignee: Robert Bosch GmbH, Stuttgart (DE)

( * ) Notice: Under 35 U.S.C. 154(b), the term of this patent shall be extended for 0 days.

(21) Appl. No.: 09/319,216

(22) PCT Filed: May 18, 1999

(86) PCT No.: PCT/FR99/01177

§ 371 Date: Jun. 1, 1999

§ 102(e) Date: Jun. 1, 1999

(87) PCT Pub. No.: WO99/62749

PCT Pub. Date: Dec. 9, 1999

(30) Foreign Application Priority Data

May 29, 1998 (FR) .................................................. 98 06783
Jun. 26, 1998 (FR) .................................................. 98 08100

(51) Int. Cl.[7] ....................................................... F15B 9/10
(52) U.S. Cl. ............................................................ 91/369.2
(58) Field of Search ............................... 91/369.1, 369.2, 91/369.3, 369.4, 375 R, 376 R

(56) References Cited

U.S. PATENT DOCUMENTS 4,173,172 * 11/1979 Ohmi .................................. 91/369.3
4,242,943 * 1/1981 Nakamura et al. .................. 91/369.2
4,577,548 * 3/1986 Gautier ................................ 91/369.2

* cited by examiner

Primary Examiner—John E. Ryznic
(74) Attorney, Agent, or Firm—Leo H. McCormick, Jr.; Warren Comstock

(57) ABSTRACT

A pneumatic brake booster for a motor vehicle having a rigid casing (1) with a moving partition (2) to define a front chamber (11) and a rear chamber (12) therein. A pneumatic piston (3) carried by the moving partition (2) has a bore which retains a three-way valve (6). The three-way valve (6) is connected to an actuating rod (4) which acts on a plunger (5) to connect the front chamber (11) to the rear chamber (12) with a first pressure in a rest position and connects the rear chamber (12) to a second pressure in an actuation position. In the actuation position, a pressure differential develops across the movable partition (2) to create a boost force which is transmitted to a push rod (7) through a reaction disc (9) retained in a cup (8) to develop a braking force in response to an input force applied to the actuating rod (4). An intermediate member (10) located between the cup (8) and plunger (5) slides with respect to the piston (3) and plunger (5). During an emergency situation, members (33,103, 81, 16) of the intermediate member (10) secure the cup (8) to piston (3) and allow a braking force to be maintained by wheel brakes of a vehicle even if an operator terminates an input force.

9 Claims, 5 Drawing Sheets

PNEUMATIC BOOSTER WITH FLOATING REACTION DISC AND DYNAMICALLY CANCELLABLE REACTION

The present invention relates to a pneumatic brake booster.

More specifically, the invention relates to a pneumatic brake booster comprising: a rigid casing; a moving partition delimiting, in leaktight manner, a front chamber and a rear chamber inside the casing, the front chamber in operation being subject to a first pressure and the rear chamber being connected selectively to the front chamber or subject to a second pressure higher than the first; a pneumatic piston moving with the moving partition; an axial operating rod moving in the piston as a function of an input force selectively exerted against a return force and oriented in an axial actuating direction pointing towards the front chamber, the return force urging the operating rod towards a return position, and the input force urging the operating rod towards an actuating position which depends on the input force; a plunger made to slide in the piston by the operating rod; a three-way valve connecting the rear chamber to the front chamber when the operating rod is in the position of rest, and subjecting the rear chamber to the second pressure when actuated by a movement of the operating rod towards its actuating position; and force-transmission means capable of receiving and of passing on at least part of the input force transmitted by a front face of the plunger, and a boost force exerted by a front face of the piston when the valve is actuated, these force-transmission means themselves comprising a pushrod of which one end adjacent to the plunger is capped by a cup in which a reaction disc is housed, a first face of the reaction disc receiving the input force and the boost force, and a second face of the reaction disc bearing against the cup; and stop means for limiting the sliding of the plunger with respect to the cup to a predetermined travel.

BACKGROUND OF THE INVENTION

Devices of this type are well known in the prior art, as illustrated, for example, in patent documents U.S. Pat. No. 3,470,697, FR-2,532,084 and FR-2,658,466.

The continuing preoccupation with reducing braking distances has recently led to the development of various arrangements aimed at reducing booster response times, particularly during emergency braking.

The invention falls within this context and its purpose is to provide a simple solution to this problem, at the same time allowing optimum and immediate use of the braking force exerted by the driver, wider opening of the booster inlet valve, and better air flow towards the rear chamber of the booster.

SUMMARY OF THE INVENTION

To this end, the booster of the invention, which in other respects is in accordance with the definition in the above preamble, is essentially characterized in that the force-transmission means comprise an intermediate member mounted to slide axially with respect to the plunger and with respect to the piston, and capable of being driven by the plunger, with respect to the piston, over a driven distance that exceeds the determined travel, and in that this intermediate member is at least partially inserted between the front face of the piston and the first face of the reaction disc so as to be able to pass on to the reaction disc the boost force when it occurs, and in that the stop means are borne by the plunger and the intermediate member and define a maximum excursion of the plunger with respect to the intermediate member.

According to a preferred embodiment of the invention, the intermediate member is at least partially arranged radially between the plunger and a stepped axial bore of the piston, and at least partially arranged radially between the cup and the stepped axial bore of the piston.

The stop means may, for example, comprise a snap ring secured to the plunger and mounted to slide in a groove of the intermediate member, and a step of the plunger capable of coming to bear against a rear face of the intermediate member.

By virtue of the layout given to the booster of the invention, it is possible to contrive for the piston to be urged towards its position of rest by a spring which exerts no force on the intermediate member itself.

Furthermore, it is possible to contrive for the booster of the invention, once actuated by a sudden application of the brakes, to continue to apply a strong braking force even if the driver partially releases his own braking force.

To this end, provision is preferably made for the moving partition to comprise a rigid skirt mounted so that it can slide with respect to the piston so that it can adopt, with respect to the piston, a forward position in the axial actuating direction, and for the booster to comprise means of firmly securing the cup to the piston, these securing means being placed in an operational state by the intermediate member when this intermediate member reaches a predetermined driven position with respect to the piston, and being locked in their operational state by the rigid skirt when this rigid skirt adopts its forward position.

According to one possible embodiment, the means of firmly securing attaching the cup to the piston comprise a sharp-edged radial drilling made in the axial bore of the piston, a tapering-edged radial drilling made in the intermediate member, an external housing defined in the cup, and a ball engaged in the sharp-edged drilling, this ball passing through the tapering-edged drilling to engage in the housing when the intermediate member has reached its predetermined driven position.

In this case, the rigid skirt hasp for example, an internal locking edge capable of pressing the ball into the housing when this rigid skirt adopts its forward position while the intermediate member has reached its predetermined driven position.

Other features and advantages of the invention will emerge clearly from the description thereof given hereafter by way of non-limiting indication with reference to the appended drawings:

DETAILED DESCRIPTION OF THE INVENTION

Figure 1:
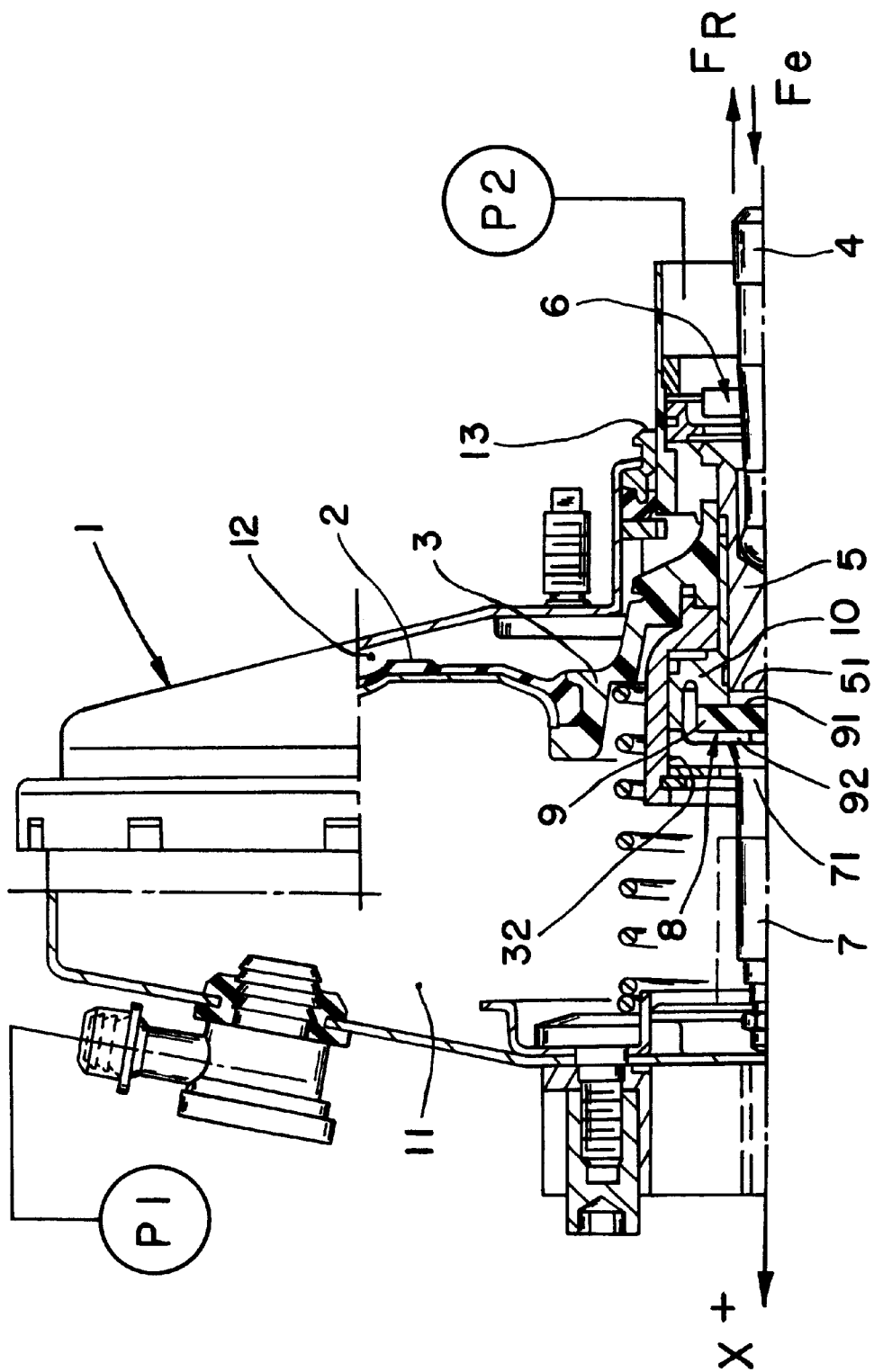
FIG. 1 is a view in part section of a booster in accordance with the invention, seen at rest.

A pneumatic booster in accordance with the invention comprises, in the known way, a rigid casing 1 defining an internal volume that is split in leaktight manner by a moving partition 2 into a front chamber 11 and a rear chamber 12, the front chamber 11 in operation being subject to a relatively low first pressure P1.

A pneumatic piston 3 moves with the moving partition 2 and slides through an opening 13 in the casing 1.

The booster is operated by an operating rod 4 that can move in the piston 3 between a position of rest (FIGS. 1 and 3) and an extreme actuating position (FIG. 2), the position of this rod in the piston depending, in particular, on an input force Fe which is applied to this rod in an axial actuating direction X+ by the brake pedal (not depicted), on the rate at which this input force Fe is applied, on a return force Fr exerted in the opposite direction by any appropriate means, and on a reaction force in the same sense as the return force.

When the input force Fe is applied slowly to the operating rod 4, the latter adopts an actuating position that is part way between its position of rest (FIGS. 1 and 3) and its extreme actuating position (FIG. 2), the operating rod reaching its extreme actuating position only when the input force Fe is applied at a rate that exceeds a given limiting rate.

A plunger 5, driven by the operating rod 4, is mounted to slide in the piston 3 in order to control the state of a three-way valve 6.

When the booster is at rest (FIGS. 1 and 3), the valve 6 isolates the rear chamber 12 from a source of pressure, generally consisting of the atmosphere, which delivers a pressure P2 higher than the pressure P1 to which the front chamber 11 is subjected.

By contrast, when an input force Fe that is appreciably higher than the return force Fr is exerted on the rod 4, this force Fe causes the plunger 5 to move in the actuating direction X+ and the valve 6 opens the rear chamber 12 to the pressure P2.

The ingress of air into the rear chamber pushes the moving partition 2 back in the actuating direction X+ and generates a boost force Fa (not depicted) which is exerted on the front face 31 of the piston 3.

The input force Fe, which is transmitted by the front face 51 of the plunger 5, and the boost force Fa, which is transmitted by the front face 31 of the piston 3, are applied together to force-transmission members which use them to actuate a brake pressure emitter (not depicted).

In the conventional way, these force-transmission members essentially comprise a pushrod 7, of which one end 71 adjacent to the plunger is capped by a cup 8, and a reaction disc 9 housed in the cup 8.

More specifically, a first face 91 of the reaction disc 9 receives the input force Fe and the boost force Fa, and a second face 92 of the reaction disc 9 bears against the cup 8.

Stop means, which generally adopt the form of a stop key placed between the plunger 5 and the piston 3 in the prior art, are also provided, for limiting the sliding of the plunger 5 with respect to the cup 8 to a determined travel K (FIG. 3), these stop means having a different arrangement in the invention and fulfilling a different function.

Figure 3:
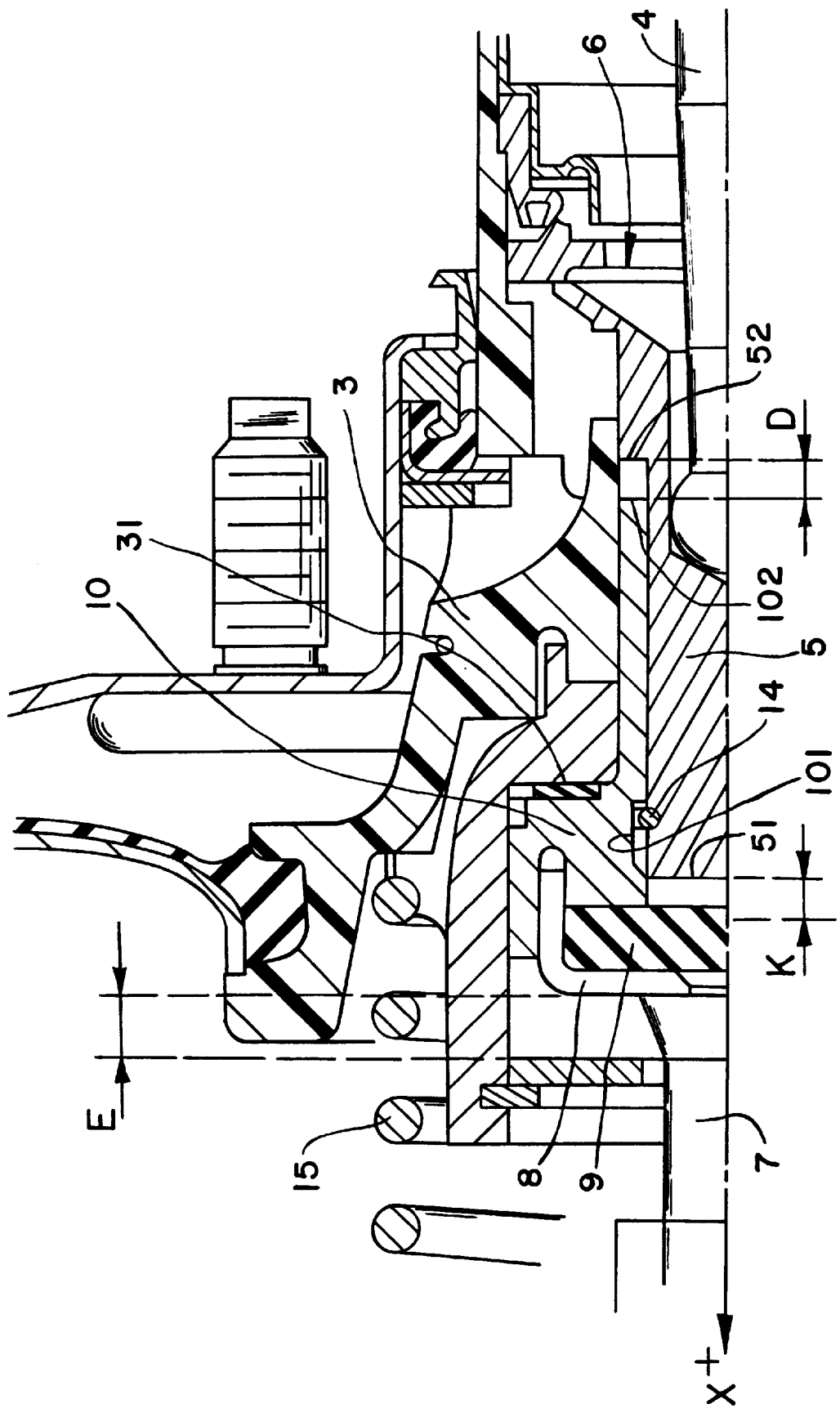
FIG. 3 is an enlarged view of part of FIG. 1.

According to the invention, the forces applied are transmitted partly by an intermediate member 10 which is mounted to slide axially with respect to the plunger 5 and with respect to the piston 3 and which can be driven by the plunger 5, with respect to the piston 3, over a driven distance E that exceeds the travel K that the plunger 5 can cover with respect to the cup 8 (FIG. 3).

The intermediate member 10 is mounted to slide in a stepped axial bore 32 of the piston and arranged radially between the plunger 5 and the cup 8 on the one hand, and the bore 32 on the other hand.

This intermediate member 10 is furthermore at least partially inserted, in the axial direction X+, between the front face 31 of the piston 3 and the first face 91 of the reaction disc 9 so that it can pass on to the reaction disc 9 the boost force Fa when this force Fa appears and urges the intermediate member 10 in the axial actuating direction X+.

Finally, according to the invention, the stop means are borne by the plunger 5 and by the intermediate member 10 and serve to define a maximum excursion D of the plunger 5 with respect to the intermediate member 10 (FIG. 3).

Under these conditions, not only does the swift application of an input force Fe to the operating rod 4 allow the pushrod 7 to be actuated immediately without the piston 3 having to be driven, but the large value accorded to the driven distance E also allows optimum opening of the valve 6 and therefore a reduction in the booster response time.

In the embodiment illustrated, which is given by way of example, the stop means comprise, on the one hand, a snap ring 14 secured to the plunger 5 and mounted to slide in a groove 101 of the intermediate member 10 to define the furthest forward position of the intermediate member 10 with respect to the plunger 5 in the axial direction X+ and, on the other hand, a step 52 of the plunger, interacting selectively with a rear face 102 of the intermediate member 10, to define the furthest forward position of the plunger 5 with respect to the intermediate member 10 in this same axial direction X+.

By virtue of the layout given to the booster of the invention, it is thus possible to contrive for the piston 3 to be urged towards its position of rest (FIG. 1 and 3) by a spring 15 which exerts no force on the intermediate member 10 itself.

Figure 4:
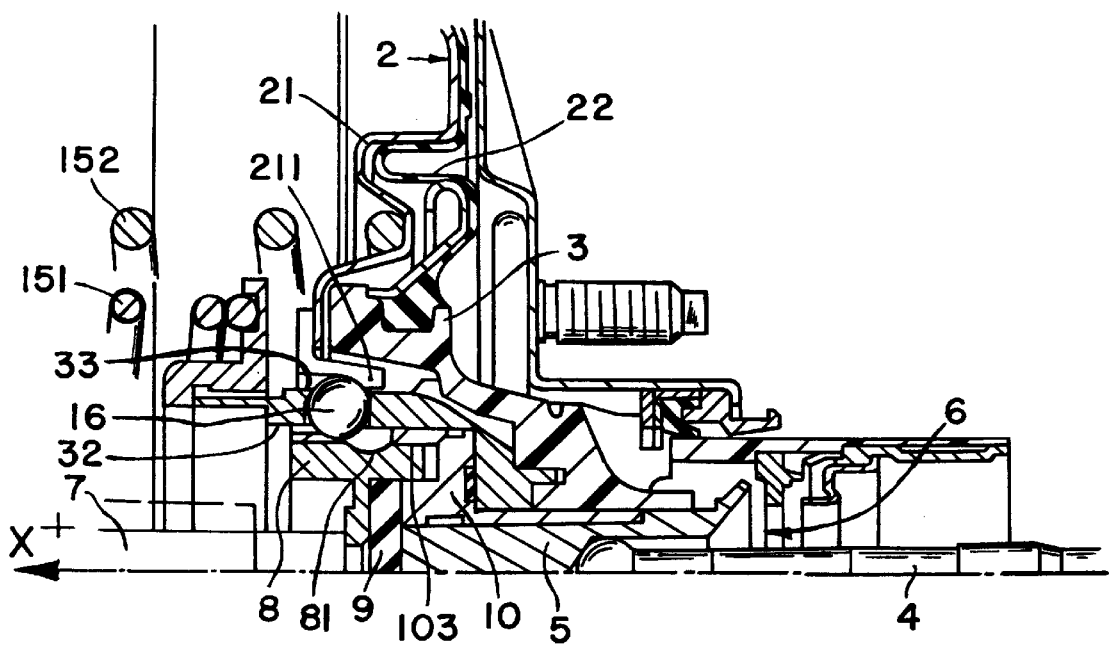
FIG. 4 is an enlarged view of part of a booster in accordance with an improved embodiment of the invention, seen at the moment of application of a relatively slow and moderate braking force.
Figure 5:
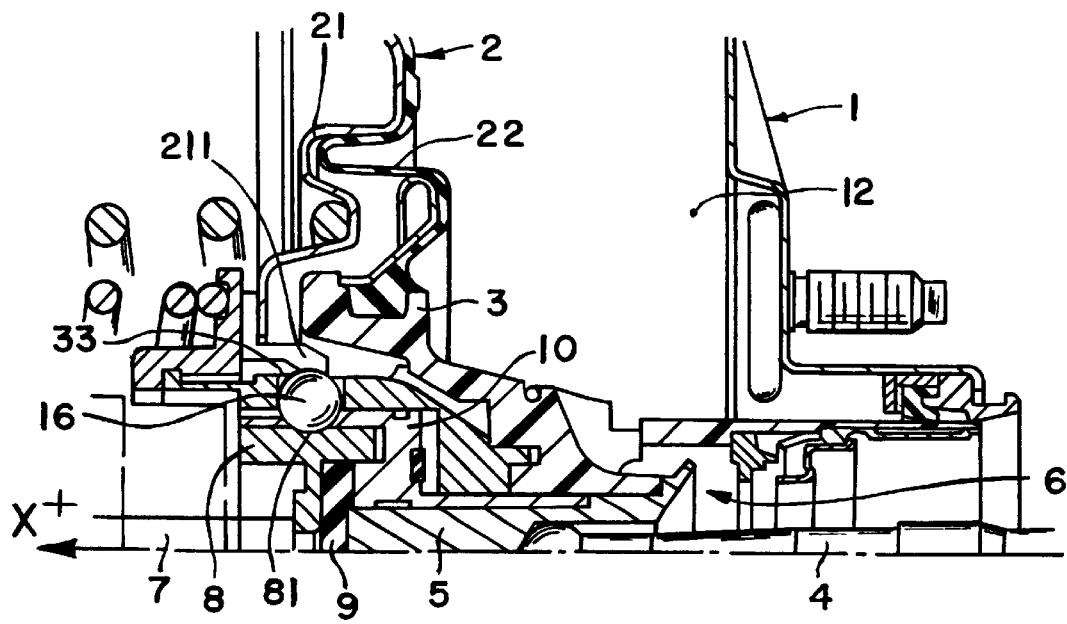
FIG. 5 is a view similar to FIG. 4, illustrating an improved booster seen after a relatively sudden and strong braking force has been applied.
Figure 6:
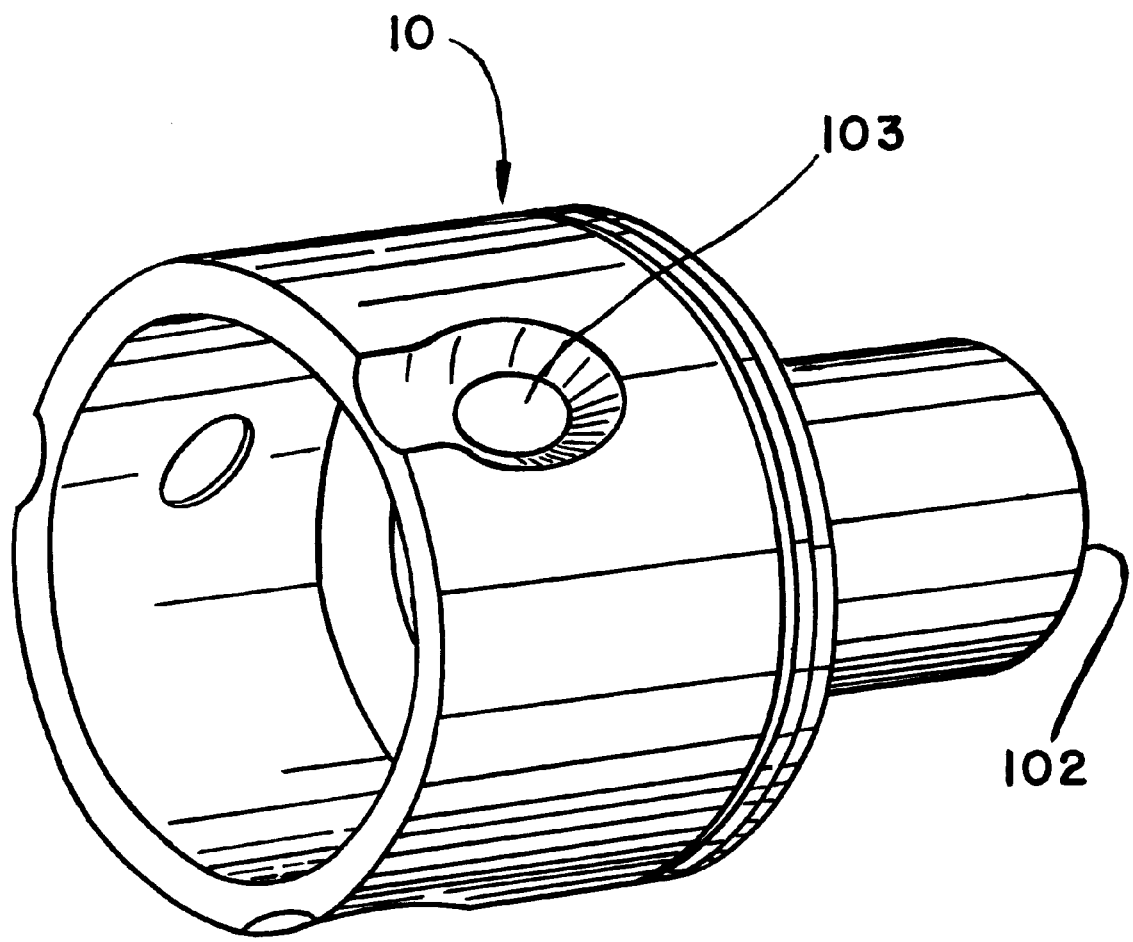
FIG. 6 is a perspective view of an intermediate member that can be used in the booster of FIGS. 4 and 5.

FIGS. 4 to 6 illustrate an alternative form of the booster described hitherto, and in which following a sudden actuation of the booster, the boost force is passed on directly to the pushrod so that the brakes continue to be actuated without the input force having to continue to overcome a reaction force that is proportional to the boost force.

In this embodiment, the moving partition 2 comprises a rigid skirt 21 independent of the piston 3, and a flexible diaphragm 22 secured to the piston 3, the rigid skirt 21 thus being mounted so that it can slide with respect to the piston 3 so that it can adopt, with respect to this piston 3, a forward position in the axial actuating direction X+, as depicted in FIG. 5.

Furthermore, the booster comprises means allowing the cup 8 to be secured firmly to the piston 3, these securing means being placed in an operational state by the intermediate member 10 when this intermediate member 10 reaches a predetermined driven position with respect to the piston 3, as illustrated in FIG. 5, and being locked in their operational state by the rigid skirt 21 when this skirt 21 adopts its forward position.

To this end, there is provided, for example, a sharp-edged radial drilling 33 made in the axial bore 32 of the piston 3, a tapering-edged radial drilling 103 made in the intermediate member 10, an external housing 81 defined in the cup 8, and a ball 16 engaged in the sharp-edged drilling 33.

The drillings 33, 103 and the housing 81 are arranged with respect to each other in such a way that the ball 16 passes through the tapering-edged drilling 103 and becomes engaged in the housing 81 when the intermediate member 10 has reached its predetermined driven position, as shown in FIG. 5.

Furthermore, the rigid skirt 21 preferably has an internal locking edge 211 capable of pressing the ball 16 into the bottom of the housing 81 when this skirt 21 adopts its forward position while the intermediate member 10 has reached its predetermined driven position, the rigid skirt thus strengthening the securing of the cup 8 to the piston 3 by means of the ball 16.

Of course, the booster of the invention may comprise a number of drillings such as 33, 103, a number of housings such as 81, and a number of balls such as 16, FIG. 6 depicting an intermediate member 10 designed for a booster using three of each of these components.

Figure 2:
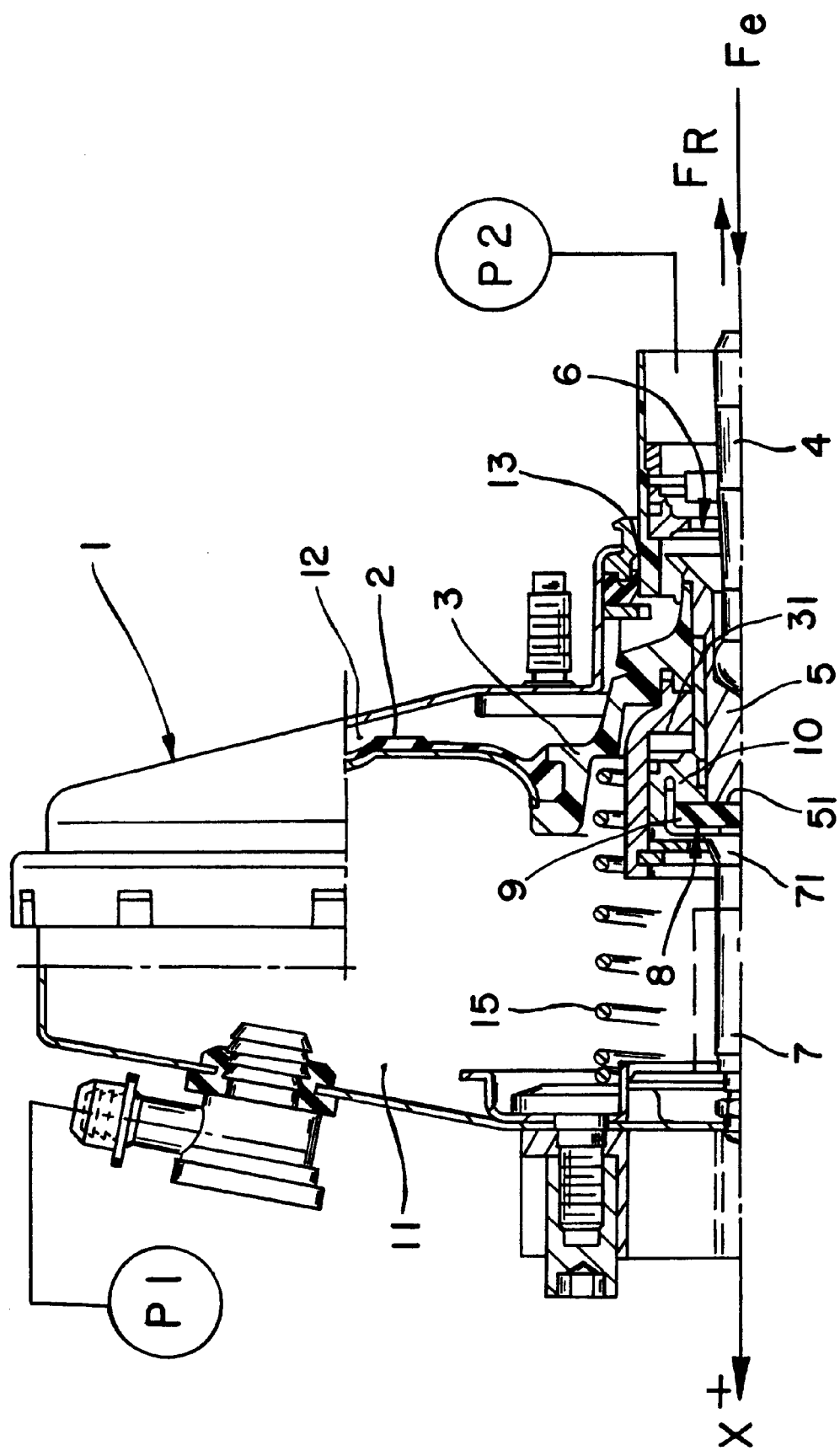
FIG. 2 is a view in part section of a booster in accordance with the invention, seen just at the moment where a sudden input force is applied to the operating rod.

Furthermore, it may be useful to envisage two springs 151 and 152 in place of the single spring 15 illustrated in FIGS. 2 and 3, so as to allow both the piston 3 and the rigid skirt 21 to return to the position of rest.

The specific operation of the booster illustrated in FIGS. 4 to 6 is as follows.

In the event of an application of the brakes that is moderate both in terms of rate and in terms of intensity (FIG. 4), the piston 3 is driven in the actuating direction X+ at a rate that is at least as fast as the rate at which the plunger 5 and the intermediate member 10 travel, which means that the ball 16, guided in the sharp-edged drilling 33, remains against one edge of the tapering-edged drilling 103 without being able to drop into the housing 81 in the cup 8.

Under these conditions, the boost force exerted by the piston 3 is passed on by the intermediate member 10 to the reaction disc 9, which in return exerts a reaction force applied to the plunger 5.

By contrast, in the event of an application of the brakes which is both quick and intense (FIG. 5), the piston 3 is driven in the actuating direction X+ at a rate which is far faster than the rate at which the plunger 5 and the intermediate member 10 travel, which means that the ball 16, guided in the sharp-edged drilling 33, passes through the tapering-edged drilling 103 and drops into the housing 81 of the cup 8. The rigid skirt 21, progressing in the actuating direction X+, will then, by means of its internal edge 211 pressing against the ball 16, reinforce the holding of this ball in the housing 81.

Under these conditions, the cup 8, the piston 3 and the rigid skirt 21 move together as if they were made as a single piece, and continue to apply a braking force without the input force Fe having to overcome the reaction force Fr which deforms the disc 9, at least as long as this input force remains high enough to continue to hold the valve 6 open.

In summary, the specific features described with reference to FIGS. 4 to 6 give the booster of the invention the characteristic of placing itself, following a sudden application of the brakes, in a particular configuration in which this booster continues to apply a braking force even when the input force is no longer high enough to remain proportional to this braking force.

What is claimed is:

1. A pneumatic brake booster comprising:

a rigid casing;

a moving partition for delimiting in a leaktight manner said rigid casing into a front chamber and a rear chamber, said from chamber being subject a first front chamber and a teat chamber being selectively connected to said front chamber to receive said first pressure or a second pressure, said second pressure having a higher pressure than said first pressure;

a pneumatic piston moving with said moving partition;

an axial operating rod moving in said pneumatic piston as a function of an input force selectively resisting a reaction force and oriented in an axial actuating direction pointing toward said front chamber, said reaction force urging said operating rod toward a return position while the input force urges said operating rod toward an actuating position;

a plunger slidable within said pneumatic piston by said operating rod;

a three-way valve connecting said rear chamber to said front chamber when said operating rod is in a position of rest and subjecting said rear chamber to said second pressure when actuated by movement of said operating rod toward an actuating position; and force transmitting means for receiving and passing at least a portion of said input force transmitted by a front face of said plunger and a boost force exerted by a front face of said pneumatic piston when said three-way valve is actuated, said three-way valve comprising: a pushrod having a first end adjacent said plunger capped by a cup which houses a reaction disc, said reaction disc having a first face for receiving said input force and boost force and a second face for bearing against said cup; and stop means for limiting the sliding of said plunger with respect to said cup to a predetermined travel; said force transmitting means being characterized by an intermediate member mounted to slide axially with respect to said plunger with respect to said pneumatic piston and driven by said plunger with respect to said piston over a driven distance which exceeds said predetermined travel, said intermediate means being at least partially inserted between said front face of said piston and said first face of said reaction disc for passing said boost force to said reaction disc; and stop means borne by said plunger and said intermediate member comprising a snap ring secured to said plunger and mounted to slide in a groove of said intermediate member to define a maximum excursion of the plunger with respect to said intermediate member.

2. The booster according to claim 1 wherein said intermediate member is further characterized by being at least partially arranged radially between said plunger and a stepped axial bore of said piston.

3. The booster according to claim 2 wherein said intermediate member is further characterized by being at least partially arranged radially between said cup and said stepped axial bore of said piston.

4. The booster according to claim 1 wherein said stop means is further characterized by a step on said plunger which bears against a rear face of said intermediate member.

5. The booster according to claim 1 wherein said piston is further characterized by being urged toward a rest position by a spring which exerts no force on said intermediate member.

6. The booster according to claim 3 wherein said moving partition is characterized by a rigid skirt mounded to slide with respect to said piston for establishing a forward position with respect to said piston, said forward position being in the axial actuating direction.

7. The booster according to claim 6 further comprising securing means for firmly securing said cup to said piston, said securing means being placed in an operating state by said intermediate member when said intermediate member reaches a predetermined driven position with respect to said piston and locked in said operating state by said rigid skirt when said rigid skirt is in said forward position.

8. The booster according to claim 7 wherein said securing means is further characterized a sharp-edged radial drilling made in a stepped axial bore of said piston, a tapering-edged radial drilling made in said intermediate member, an external housing defined in said cup and a ball located in said sharp-edged radial drilling, said ball passing through said tapering-edged drilling to engage said external housing when said intermediate member reaches its predetermined driven position.

9. The booster according to claim 8 wherein said rigid skirt is further characterized by an internal locking edge which presses said ball into said external housing when said rigid skirt is in its forward position and said intermediate member reaches its predetermined driven position.

* * * * *